(12) United States Patent
Lesyna (10) Patent No.: US 8,306,551 B2
(45) Date of Patent: Nov. 6, 2012

(54) METHOD AND SYSTEM FOR LIMITING THE FUNCTIONALITY OF A MOBILE ELECTRONIC DEVICE

(75) Inventor: Michael Lesyna, Los Altos Hills, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1191 days.

(21) Appl. No.: 11/810,279

(22) Filed: Jun. 4, 2007

(65) Prior Publication Data

US 2008/0299900 A1  Dec. 4, 2008

(51) Int. Cl.
*H04W 24/00* (2009.01)

(52) U.S. Cl. ...... 455/456.1; 455/441; 455/345; 455/57.11; 455/557; 701/1

(58) Field of Classification Search .......... 455/456.1, 455/441, 345, 410, 67.11, 557; 701/1
See application file for complete search history.

(56) References Cited

U.S. PATENT DOCUMENTS

| | | | |
|---|---|---|---|
| 6,266,589 | B1 | 7/2001 | Boies et al. |
| 7,505,784 | B2 | 3/2009 | Barbera |
| 2002/0123329 | A1* | 9/2002 | Murray .................. 455/414 |
| 2003/0139205 | A1* | 7/2003 | Belcher et al. ............. 455/565 |
| 2004/0198306 | A1 | 10/2004 | Singh et al. |
| 2007/0004413 | A1* | 1/2007 | Mahajan et al. .............. 455/441 |
| 2007/0072553 | A1* | 3/2007 | Barbera ................ 455/67.11 |
| 2007/0072616 | A1* | 3/2007 | Irani .............................. 455/441 |
| 2010/0216509 | A1* | 8/2010 | Riemer et al. ................ 455/557 |

FOREIGN PATENT DOCUMENTS

| | | |
|---|---|---|
| EP | 1122897 | 8/2001 |
| KR | 10-1999-0015179 | 3/1999 |
| KR | 10-2000-0030500 | 6/2000 |
| KR | 10-2000-0074382 | 12/2000 |
| KR | 1020000074382 | * 12/2000 |
| KR | 10-2002-0070932 | 9/2002 |

OTHER PUBLICATIONS

"ISA/US", International Search Report and Written Opinion for International Application No. PCT/US2008/065670., (Sep. 4, 2008),11 pages.

* cited by examiner

*Primary Examiner* — Kamran Afshar
*Assistant Examiner* — Manpreet Matharu (57) ABSTRACT

Embodiments of the present invention recite a method and system for limiting the functionality of a mobile electronic device. In one embodiment, a position determining component disposed within the mobile electronic device is used to determine the speed of the mobile electronic device. It is then determined that the speed of the mobile electronic device exceeds a speed threshold. Based upon determining that the speed of the mobile electronic device exceeds the speed threshold, the functionality of said mobile electronic device is restricted.

49 Claims, 4 Drawing Sheets

METHOD AND SYSTEM FOR LIMITING THE FUNCTIONALITY OF A MOBILE ELECTRONIC DEVICE

FIELD OF THE INVENTION

Embodiments of the present invention are related to the field of controlling the functionality of mobile electronic devices.

BACKGROUND OF THE INVENTION

Driver distractions are currently a leading cause of traffic accidents. Of particular concern are drivers who operate mobile electronic devices (e.g., cellular telephones, Personal Digital Assistants (PDAs) and the like) while driving. Many people feel that drivers who are talking on a cellular telephone are particularly prone to accidents or careless driving. This is especially true of teenage drivers who do not have the level of experience of older drivers. Talking on cellular telephones is not the only distraction that drivers face. Attempting to dial a phone number, access or send text messages, or operate the user interface in general are particularly dangerous as the driver typically is looking at the cellular telephone rather than the road.

SUMMARY OF THE INVENTION

Embodiments of the present invention recite a method and system for limiting the functionality of a mobile electronic device. In one embodiment, a position determining component disposed within the mobile electronic device is used to determine the speed of the mobile electronic device. It is then determined that the speed of the mobile electronic device exceeds a speed threshold. Based upon determining that the speed of the mobile electronic device exceeds the speed threshold, the functionality of said mobile electronic device is restricted.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "using," "determining," "restricting," "utilizing," "generating," "permitting," "disabling," "terminating," "requiring," "shutting off," "implementing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
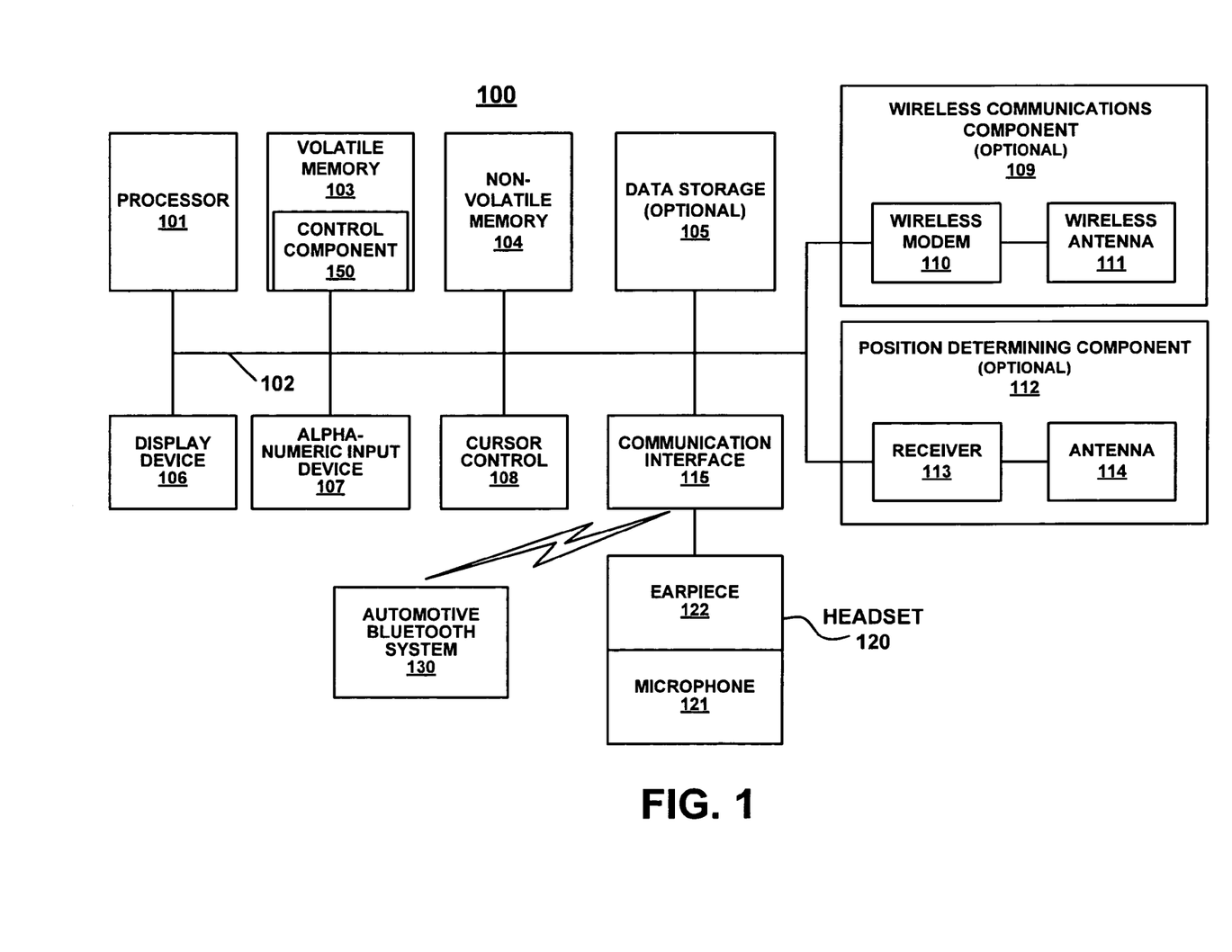
FIG. 1 is a block diagram of a mobile electronic device upon which embodiments of the present invention may be implemented.

With reference to FIG. 1, portions of the present invention are comprised of executable instructions that reside, for example, in mobile electronic device 100. In FIG. 1, mobile electronic device 100 comprises a processor 101 coupled with an address/data bus 102. Processor 101 is for processing digital information and instructions and bus 102 is for conveying digital information between various components of mobile electronic device 100. Also coupled with bus 102 is a volatile memory (e.g., RAM) 103 for storing the digital information and instructions of a more volatile nature and a non-volatile memory (e.g., ROM) 104 for storing information and instructions of a more permanent nature. In addition, mobile electronic device 100 may optionally include a data storage device 105 for storing vast amounts of data. In embodiments of the present invention, data storage device 105 may comprise a magnetic data storage device, or optical data storage device. It should be noted that instructions for processor 101 can be stored in non-volatile memory 104, volatile memory 103, or data storage device 105.

Returning still to FIG. 1, mobile electronic device 100 further comprises a display device 106, an alpha-numeric input device 107 (e.g., a keyboard), and a cursor control device 108 (e.g., mouse, trackball, light pen, etc.) for inputting data, selections, updates, etc. Display device 106 of FIG. 1 may be a liquid crystal device, cathode ray tube, or other display device suitable for creating graphic images and alpha-numeric characters recognizable to a user. In one embodiment, display device may display an alpha-numeric interface which can be used to implement a "soft-key" functionality. Cursor control device 108 allows a user to dynamically signal the two dimensional movement of a visible symbol (cursor) on a display screen of display device 106. Many implementations of cursor control device 108 are known in the art including a trackball, mouse, touch pad, joystick, or special keys capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Returning to FIG. 1, mobile electronic device 100 further comprises a wireless communications component 109, comprising a wireless modem 110 and a wireless antenna 111, coupled with bus 102. An optional GNSS position determining component 112, comprising a GNSS receiver 113 and a GNSS antenna 114, is also coupled with bus 102.

Wireless communications component 109 is for transmitting and receiving wireless messages (e.g., data and/or commands). In one embodiment, wireless communications component 109 comprises a cellular wireless antenna 111 and a cellular wireless modem 110. In one embodiment, mobile electronic device 100 sends and receives message using the Short Message Service (SMS). However, mobile electronic device 100 is well suited to utilize other message formats as well.

GNSS position determining system 112 is for determining the location of mobile electronic device 100. In FIG. 1, position determining component 111 comprises a GNSS antenna 114 and a GNSS receiver 113. However, mobile electronic device 100 is not limited to using a GNSS position determining system alone. For example, position determining component 110 may determine the location of mobile electronic device 100 using cellular telephone signals, digital television signals, terrestrial-based navigation systems, inertial navigation systems, etc.

In FIG. 1, mobile electronic device 100 further comprises a communication interface 115 which is coupled with bus 102. In one embodiment, communication interface 115 is communicatively coupled with a headset 120 comprising a microphone 121 and an earpiece 122. In one embodiment, headset 120 is communicatively coupled with communication interface 115 via a wireless communication system such as the Bluetooth® system. In another embodiment, headset 120 is coupled with communication interface 115 via a wired connection.

Also shown in FIG. 1 is an automotive Bluetooth® system 130 which is communicatively coupled with communication interface 115. In embodiments of the present invention, mobile electronic device 100 may be communicatively coupled with automotive Bluetooth® system 130 which permits a user to operate, for example, a cellular telephone using voice commands while operating a moving vehicle. Automotive Bluetooth® system 130 typically synchronizes with mobile electronic device 100 via a Bluetooth® system local network and interprets a user's voice commands to control mobile electronic device 100 via a Bluetooth® connection.

Also shown in FIG. 1 is a control component 150 stored in volatile memory 103. As will be discussed in greater detail below, control component 150 is for limiting the functionality of mobile electronic device 100 when the speed of mobile electronic device 100 exceeds a speed threshold.

Figure 2:
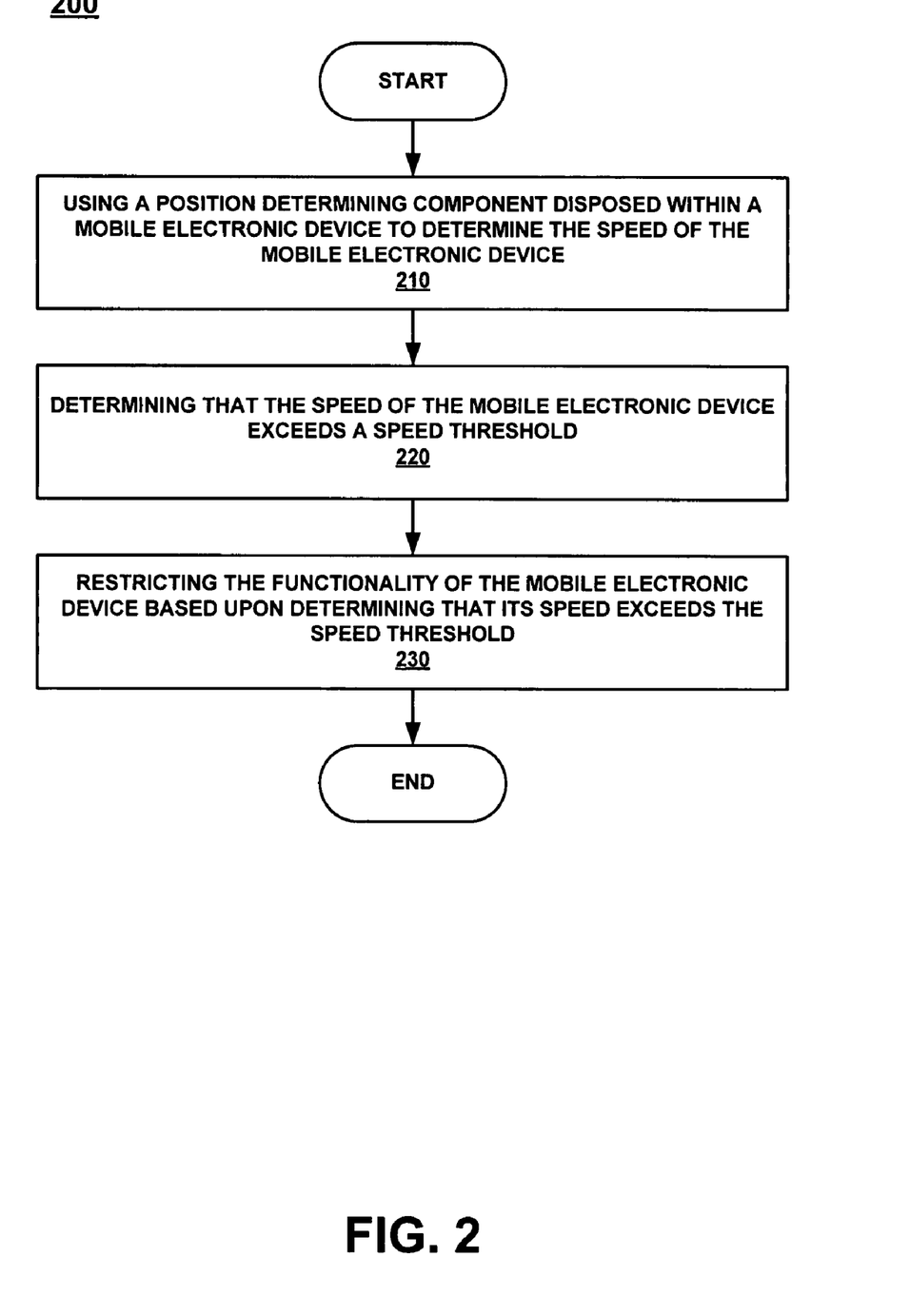
FIG. 2 is a flowchart of a method for limiting the functionality of a mobile electronic device in accordance with embodiments of the present invention.

FIG. 2 is a flowchart of a method 200 for limiting the functionality of a mobile electronic device in accordance with embodiments of the present invention. In embodiments of the present invention, method 200 is implemented by control component 150 of FIG. 1. In step 210 of FIG. 2, a position determining component disposed within a mobile electronic device is used to determine the speed of the mobile electronic device. Referring again to FIG. 1, embodiments of the present invention utilize a position determining device (e.g., 112) disposed within 100 mobile electronic device to determine the speed of the mobile electronic device 100. For example, in one embodiment, successive position fixes determined by position determining component 112, as well as the time interval between these position fixes, can be used to determine the speed of mobile electronic device 100 for a given period. In other words, the distance traveled by mobile electronic device 100 over a period of time is determined.

Embodiments of the present invention benefit from the increasing integration of position determining components, such as GNSS devices, into mobile electronic devices. As an example, cellular telephones increasingly integrate Global Positioning System (GPS) or other GNSS devices to comply with the Wireless Enhanced 911 service. Other mobile electronic devices such as Personal Digital Assistants (PDAs) or the like also increasingly integrate GNSS devices as well. Thus, embodiments of the present invention take advantage of this integration to determine the speed of mobile electronic device 100. It is noted that embodiments of the present invention are not limited to GNSS position determining systems alone. For example, position determining component 112 may determine the location of mobile electronic device 100 using cellular telephone signals, digital television signals, terrestrial-based navigation systems, inertial navigation systems, etc.

In step 220 of FIG. 2, it is determined that the speed of the mobile electronic device exceeds a speed threshold. In one embodiment, the determination of the speed of mobile electronic device 100 is performed by processor 101 of FIG. 1. In another embodiment, the determination of the speed of mobile electronic device 100 is performed by position determining component 112. In embodiments of the present invention, a speed threshold is established which is used to determine if mobile electronic device 100 is being operated while in a moving vehicle. For example, the speed threshold of mobile electronic device can be set at 8 miles per hour. Thus, if it is determined that mobile electronic device 100 has a speed of 9 miles per hour, it is assumed that it is being operated by a user in a moving vehicle. It is noted that the speed threshold may be set higher or lower than 8 miles per hour in embodiments of the present invention. More generally, the speed threshold set for mobile electronic device 100 will be set higher than the normal walking or running speed of a human in order to be able to conclusively establish that mobile electronic device 100 is being operated in a moving vehicle, or at a speed at which it is desirable that the user not be distracted by operating mobile electronic device 100. In embodiments of the present invention, position determining component 112 may also compare one or more geographic position fixes with an electronic map to determine whether mobile electronic device 100 is being operated in a moving vehicle on a road. For example, in one embodiment, position determining component 112 can also determine the altitude at which mobile electronic device is located. Thus, if it is determined that mobile electronic device 100 is at an altitude of 10,000 feet above a road, embodiments of the present invention may determine that the functionality of mobile electronic device 100 may continue without restriction. Additionally, if the comparison of the current geographic location of mobile electronic device 100 shows that it is in the middle of a lake or river, embodiments of the present invention will allow the functionality of mobile electronic device 100 to continue without restriction. Thus, embodiments of the present invention can differentiate between whether mobile electronic device 100 is being operated in a boat, or airplane, rather than a moving vehicle.

In step 230 of FIG. 2, the functionality of the mobile electronic device is restricted based upon determining that its speed exceeds the speed threshold. In embodiments of the present invention, upon establishing that mobile electronic device 100 is being operated in a moving vehicle, the functionality of mobile electronic device 100 is restricted in order to get a user to stop using mobile electronic device in the moving vehicle. Alternatively, the functionality of mobile electronic device 100 may be automatically restricted such that operating it in a moving vehicle is undesirable, or impossible.

In one embodiment, mobile electronic device 100 is automatically shut off in response to determining that its speed exceeds the speed threshold. In another embodiment, an audible warning is generated in response to determining that the speed of mobile electronic device 100 exceeds the speed threshold. In one embodiment, the audible warning comprises a beep or tone to remind the user that the speed threshold has been exceeded and to take corrective action (e.g., to pull off the road, terminate the current operation, etc). In one embodiment, the audible warning becomes progressively louder each time it is repeated until corrective action is performed. In another embodiment, the audible warning comprises a continuous tone which reminds the user that mobile electronic device should not be operated. In one embodiment the continuous tone is loud enough to prevent a user from being able to continue a conversation using mobile electronic device 100.

In one embodiment, the display of mobile electronic device shows a warning that mobile electronic device 100 is being operated at an unsafe speed.

In one embodiment, no other text, data, graphics, or the like is displayed on display device 106 until the speed of mobile electronic device is again below the speed threshold.

In one embodiment, the keypad (e.g., alpha-numeric input device 107 of FIG. 1) is restricted until it is determined that the speed of mobile electronic device again falls below the speed threshold. In one embodiment restricting the keypad of mobile electronic device 100 comprises not processing any sequences input using the keypad. In other words, the keypad is disabled. In one embodiment, some key sequences are allowed to be processed using the keypad. For example, a user can dial 911 even if the speed of mobile electronic device exceeds the speed threshold in one embodiment. In another embodiment, a user can use the speed dialing functionality of mobile electronic device 100. This is because many users can enter short numeric sequences with a keypad without undue distraction from driving. In other words, the user is entering the sequence by feel alone. In one embodiment, the allowed key sequence may be pre-determined. For example, a parent can have mobile electronic device 100 configured such that their children can speed dial them, but are prevented from speed dialing their friends or other parties while the speed of mobile electronic device exceeds the speed threshold. In one embodiment, the allowed key sequence can be restricted to single digit speed dialing numbers, two digit speed dialing numbers, etc.

Thus, embodiments of the present invention are well suited to preventing drivers from performing actions which may be too distracting for them to operate a vehicle safely. For example, in one embodiment a user is restricted from trying to manually dial a phone number, or send a text message, if the vehicle in which they are riding is traveling faster than the speed threshold. Furthermore, embodiments of the present invention may progressively increase the level of functionality restriction imposed upon mobile electronic device 100 if a user continues to operate it while in a moving vehicle. For example, if a user continues to operate mobile electronic device 100 after an audible warning has been generated, one embodiment will automatically shut down mobile electronic device 100. In another embodiment, operation of mobile electronic device 100 is suspended until the speed of mobile electronic device 100 is again below the speed threshold. In other words, mobile electronic device 100 remains powered on, but the user is unable to utilize it until its speed again falls below the speed threshold.

In one embodiment, restricting the functionality of mobile electronic device 100 comprises permitting incoming cellular telephone calls, but preventing a user from making any outgoing calls. This prevents the user from being distracted by operating mobile electronic device 100. Thus, if an incoming call arrives, the user can simply press one button to connect the call. In one embodiment, the incoming phone call is restricted to certain permitted originators. For example, a parent can have mobile electronic device 100 configured such that their children can receive a phone call from the parent, but not from friends of the children or other parties. However, if the phone call is not from a permitted originator, the phone call is automatically terminated. Alternatively, the phone call may be automatically redirected to a voice mail system. In one embodiment, if a phone call originated prior to determining that the speed of mobile electronic device 100 has exceeded the speed threshold, the phone call is allowed to continue until the user has terminated the phone call.

In one embodiment, mobile electronic device 100 determines whether a user is utilizing a hands free device (e.g., headset 120, or automotive Bluetooth® system 130 of FIG. 1). If a hands free device is not being used to operate mobile electronic device 100, any of the above mentioned restrictions, or a combination thereof, may be automatically performed in accordance with embodiments of the present invention. This is desirable due to the fact that many states have passed, or are considering, legislation requiring drivers to user hands free devices when operating a cellular telephone in a moving vehicle. Thus, embodiments of the present invention facilitate compliance with mandated requirements regarding the operation of cellular telephones.

In one embodiment, a voice activation system may be required in accordance with embodiments of the present invention. Voice activation systems allow a user to speak a command which is then executed by, for example, mobile electronic device 100. Thus, rather than using alpha-numeric input device 107 to dial a number the user can simply speak the telephone number or say the name of the party being dialed. In embodiments of the present invention, if a voice activation system is not utilized with mobile electronic device 100, any of the above mentioned restrictions, or a combination thereof, may be automatically performed in accordance with embodiments of the present invention. In one embodiment, an outgoing phone call is restricted to certain permitted parties. For example, a parent can have mobile electronic device 100 configured such that their children can call their parent, but not call friends of the children or other parties. Thus, if the outgoing phone call is not to an allowed party, the phone call is terminated.

Embodiments of the present invention may be implemented voluntarily, or in response to a mandated requirement (e.g., a legislative restriction on the use of cellular telephones or other mobile electronic devices). For example, a parent purchasing a cellular telephone (e.g., mobile electronic device 100) for a child may voluntarily choose to use embodiments of the present invention to limit how or when the cellular telephone is used by their child. In one embodiment, when the cellular telephone is being configured (e.g., at a store), control component 150 is loaded into non-volatile memory 104. When the cellular telephone is on, control component 150 is loaded into volatile memory 103 and is used to limit the functionality of the cellular telephone as described above. Thus, parents can take steps to prevent their children from using a cellular telephone while driving and thus operate the vehicle safely. Alternatively, any user may elect to implement an embodiment of the present invention as an added safety measure. Additionally, insurance companies may find it beneficial to offer rate discounts for drivers who implement embodiments of the present invention in their cellular telephones as an incentive.

Embodiments of the present invention may also be voluntarily implemented by, for example, a cellular telephone manufacturer, or cellular telephone service provider in order to unilaterally restrict the use of cellular telephones while the user is operating a vehicle. It is noted that embodiments of the present invention may also be implemented by manufacturers or service providers of other mobile electronic devices who are seeking to curtail or restrict the use of mobile electronic devices by users who are operating a vehicle.

Embodiments of the present invention may also be implemented in response to a mandated requirement to restrict the use of cellular telephone, or other mobile electronic devices, by users who are operating a vehicle. For example, if a legislative body passes a law requiring the restriction of mobile electronic devices by users who are operating a vehicle, embodiments of the present invention provide a method of complying with that requirement. Currently, while states have enacted legislation intended to prevent cell phone use by people driving vehicles, many people ignore these laws, or forget and use their cell phones anyway.

Figure 3:
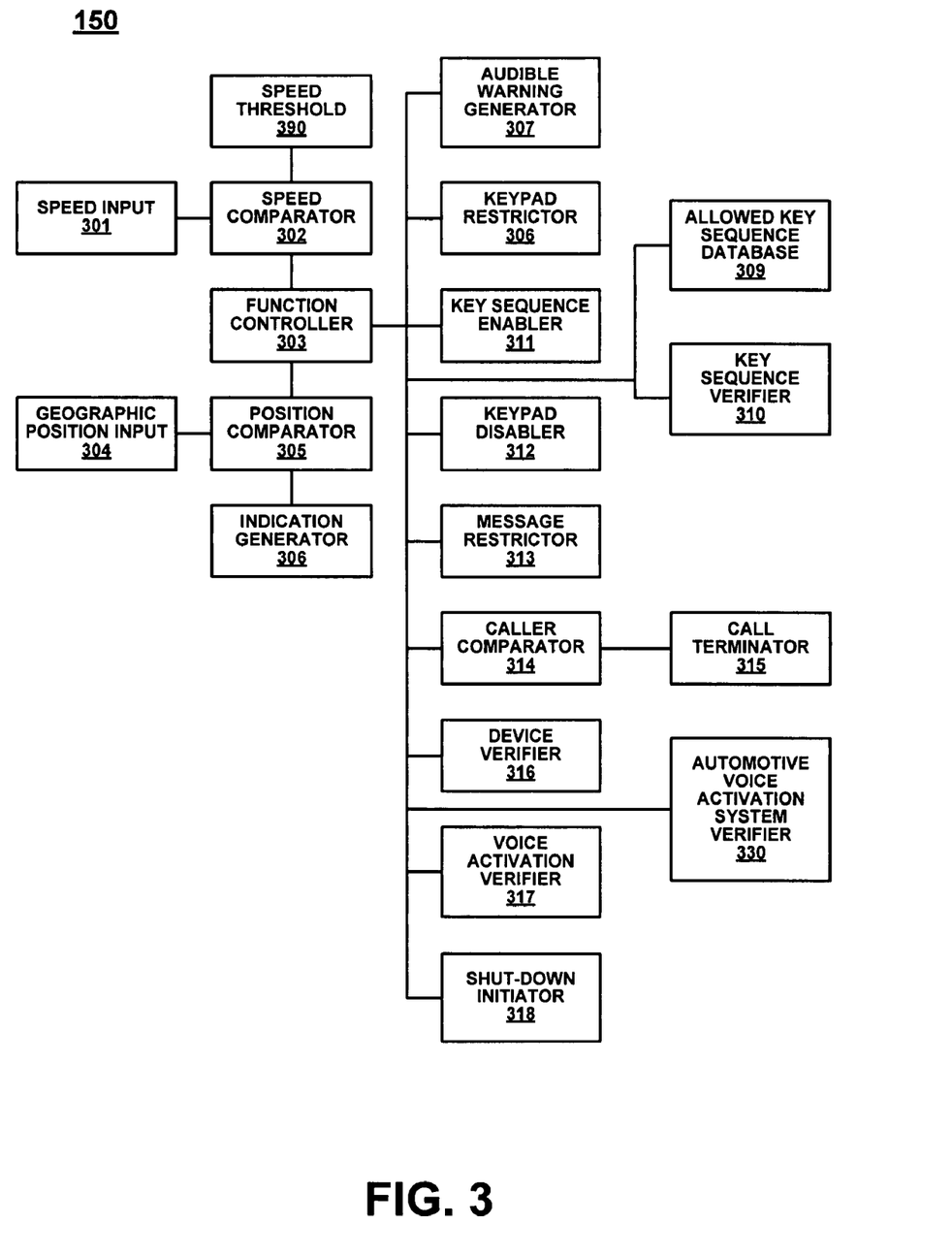
FIG. 3 is a block diagram of a control component utilized in accordance with embodiments of the present invention.

FIG. 3 is a block diagram of a control component 150 utilized in accordance with embodiments of the present invention. In the embodiment of FIG. 3, control component 150 comprises a speed input 301, a speed comparator 302 and a function controller 303. In one embodiment, geographic input 301 receives a current geographic position of mobile electronic device 100 from, for example, position determining component 112. Speed comparator 302 is for determining when the speed of mobile electronic device 100 exceeds a speed threshold (e.g., 309 of FIG. 3). Function controller 303 is for restricting the functionality of mobile electronic device 100 based upon determining that its speed exceeds speed threshold 390.

In the embodiment of FIG. 3, control component 150 further comprises a geographic position input 304 which is coupled with position comparator 305. Geographic position input 304 receives a current geographic position of mobile electronic device 100. Position comparator 305 is for determining that the current geographic position of mobile electronic device 100 comprises a road. In one embodiment position comparator 305 compares the current geographic position of mobile electronic device 100 with a map or database (not shown) which is stored upon mobile electronic device 100. An indication generator 306 is for generating and indication that the current geographic position of mobile electronic device 100 comprises a road. In one embodiment, the indication generated by indication generator 306 is used by function controller 303 to restrict the functionality of mobile electronic device 100.

In the embodiment of FIG. 3, control component 150 further comprises an audible warning generator 307. As described above with reference to FIG. 2, a variety of audible warnings and/or messages may be generated in accordance with the present invention to remind a user that they are operating mobile electronic device 100 in an unsafe manner. In one embodiment, the audible warning may prevent a user from operating mobile electronic device 100 in a satisfactory manner.

In the embodiment of FIG. 3, control component 150 further comprises a keypad restrictor 308 for restricting the use of a keypad (e.g., alpha-numeric input device 107 of FIG. 1). As described above with reference to FIG. 2, embodiments of the present invention may prevent a user from using a keypad of mobile electronic device 100 in such a manner as to prevent using mobile electronic device 100 in a moving vehicle. As noted above, embodiments of the present invention may allow some functionality of the keypad such as allowing the dialing of emergency services (e.g., 911), approved speed dialing sequences, approved telephone numbers, or approved recipients of a phone call. Additionally, embodiments of the present invention may prevent a user from entering and/or sending text messages using keypad restrictor 308.

In the embodiment of FIG. 3, control component 150 further comprises an allowed key sequence database 309 and a key sequence verifier 310. Allowed key sequence database 309 is for storing an allowed key sequence. As described above, control component 150 can be configured such that only allowed key sequences are permitted to be dialed when the speed of mobile electronic device 150 exceeds speed threshold 390. This can comprise, for example, a one digit or two digit speed dialing sequence, or the phone number of an approved party. Key sequence verifier 310 is for verifying that the key sequence entered by a user when the speed of mobile electronic device 100 exceeds speed threshold 390 comprises a key sequence stored in allowed key sequence database 309. In the embodiment of FIG. 3, control component 150 further comprises a key sequence enabler 311 for permitting the input key sequence which has been verified by key sequence verifier 310 to be entered using the keypad and executed by mobile electronic device 100.

In the embodiment of FIG. 3, control component 150 further comprises a keypad disabler 312 for disabling the keypad of mobile electronic device 100 entirely in response to determining that the speed of mobile electronic device 100 exceeds speed threshold 390.

In the embodiment of FIG. 3, control component 150 further comprises a message restrictor 313 for restricting the use of mobile electronic device 100 to receiving incoming calls. In embodiments of the present invention, upon determining that the speed of mobile electronic device 100 exceeds speed threshold 390, message restrictor 313 permits incoming telephone calls to be received. In one embodiment, message restrictor 313 is further operable for preventing an outgoing call from being made by mobile electronic device 100 while its speed exceeds speed threshold 390.

In the embodiment of FIG. 3, control component 150 further comprises a caller comparator 314 and a call terminator 315. In embodiments of the present invention, caller comparator 314 is for determining whether an incoming call is from a permitted caller. There are a variety of methods for determining whether an incoming call is coming from a permitted caller in accordance with embodiments of the present invention. In one embodiment control component 150 can compare the phone number of the incoming call to a stored database (not shown) to determine whether the incoming call is coming from a permitted caller. In embodiments of the present invention, call terminator 315 is for terminating an incoming telephone call if it is determined that the incoming call is not from a permitted originator.

In the embodiment of FIG. 3, control component 150 further comprises a device verifier 316 for verifying the use of a hands-free device to operate mobile electronic device 100. As described above with reference to FIG. 2, in one embodiment if a user is not using a hands-free device (e.g., headset 120, or automotive Bluetooth® system 130 of FIG. 1), function controller 303 will restrict the functionality of mobile electronic device 100. In one embodiment, device verifier 316 does not require the use of a hands-free device unless the speed of mobile electronic device 100 exceeds speed threshold 390.

In the embodiment of FIG. 3, control component 150 further comprises a voice activation verifier 317 for verifying the use of a voice activation system to utilize mobile electronic device 100. In one embodiment of the present invention, voice activation verifier 317 does not verify the use of a voice activation system unless the speed of mobile electronic device 100 exceeds speed threshold 390. In embodiments of the present invention, if a voice activation system is not used when the speed of mobile electronic device 100 exceeds speed threshold 390, function controller 303 will restrict the functionality of mobile electronic device 100.

In the embodiment of FIG. 3, control component 150 further comprises a shut-down initiator 318 for initiating a shut down sequence of mobile electronic device 100 if its speed exceeds speed threshold 390. It is noted that embodiments in accordance with the present invention may comprise more components than discussed above, or may comprise fewer than discussed with reference to FIG. 3.

In the embodiment of FIG. 3, control component 150 further comprises an automotive voice activation system verifier 330. In one embodiment of the present invention, automotive voice activation system verifier 330 is for verifying that an automotive voice activation system is being used to control mobile electronic device 100. In one embodiment, automotive voice activation system verifier 330 verifies that a Bluetooth® based automotive voice activation system (e.g., automotive Bluetooth® system 130) is communicatively coupled with mobile electronic device 100. Additionally, in accordance with embodiments of the present invention, the use of one or more of the above mentioned components is a configurable option when enabling control component 150. For example, in one embodiment a user can configure control component 150 such that function controller 303 utilizes keypad disabler 312 in response to determining that the speed of mobile electronic device 100 exceeds speed threshold 390. In another embodiment, a user can configure control component 150 such that function controller 303 utilizes shut-down initiator 318 in response to determining that the speed of mobile electronic device 100 exceeds speed threshold 390. Similarly, control component 150 can be configured such that function controller 303 utilizes audible warning generator 307, keypad restrictor 308, key sequence enabler 311, key sequence verifier 310, allowed key sequence database 309, message restrictor 313, caller comparator 314, call terminator 315, device verifier 316, voice activation verifier 317, automotive voice activation system verifier 330, or a combination thereof.

Figure 4:
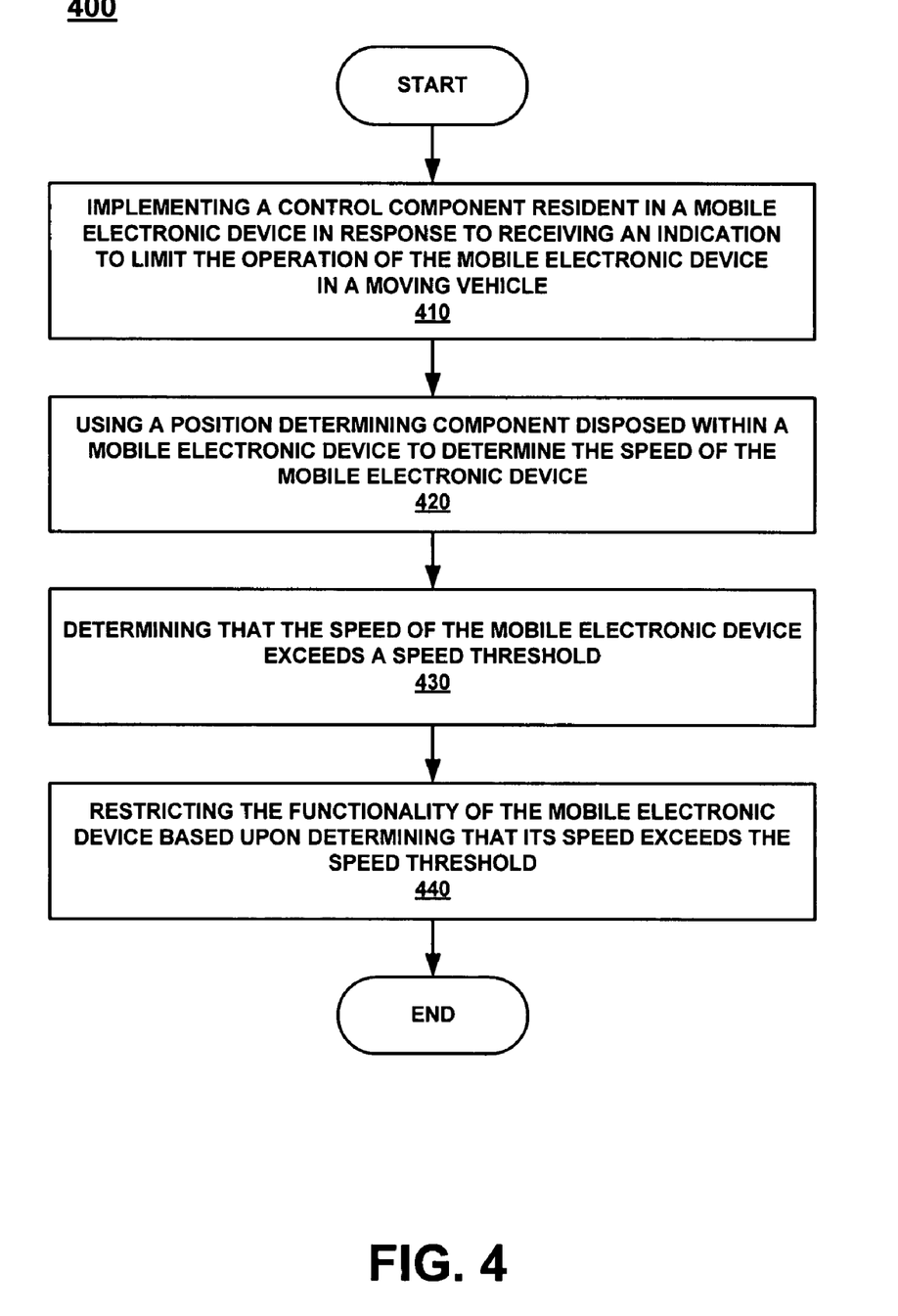
FIG. 4 is a flowchart of a method for assuring compliance with a mandated requirement in accordance with embodiments of the present invention.

FIG. 4 is a flowchart of a method 400 for assuring compliance with a mandated requirement in accordance with embodiments of the present invention. In step 410 of FIG. 4, a control component resident in a mobile electronic device is implemented in response to receiving an indication to limit the operation of the mobile electronic device in a moving vehicle. As described above, in one embodiment an indication to limit the operation of mobile electronic device 100 is voluntary. For example, a parent configuring mobile electronic device 100 to utilize control component 150 when purchasing it for a child. In another example, a user may elect to utilize control component 150 in order to receive a rate discount from an insurance company. In another embodiment, control component 150 may be utilized by, for example, a cellular telephone manufacturer or service provider in order to unilaterally limit the use of cellular telephones by people operating a vehicle. In another embodiment, control component 150 may be implemented in order to comply with a mandated requirement to limit cell phone use by people operating vehicles.

In step 420 of FIG. 4, a position determining component disposed within the mobile electronic device is used to determine the speed of the mobile electronic device. As discussed above with reference to FIG. 1, embodiments of the present invention utilize a position determining component which is disposed within a mobile electronic device (e.g., position determining component 112 of FIG. 1). This is possible in part due to the increasing integration of position determining components within mobile electronic devices such as cellular telephones, PDAs and the like.

In step 430 of FIG. 4, it is determined that the speed of the mobile electronic device exceeds a speed threshold. As described above, in embodiments of the present invention control component 150 compares the current speed of mobile electronic device 100 with speed threshold 390 to determine whether mobile electronic device 100 is being operated in a moving vehicle.

In step 440 of FIG. 4, the functionality of the mobile electronic device is restricted based upon determining that its speed exceeds the speed threshold. As discussed above, in embodiments of the present invention if it is determined that the speed of mobile electronic device 100 exceeds speed threshold 390, function controller 303 will restrict the functionality of mobile electronic device 100. In embodiments of the present invention, this may comprise shutting down mobile electronic device 100, or restricting its operation such that a user will find it inconvenient to continue using mobile electronic device 100. As a result, the user will be encouraged to pull their vehicle off of the road to continue using mobile electronic device 100, or to use it later.

The preferred embodiment of the present invention, method and system for limiting the functionality of a mobile electronic device, is thus described. While the present invention has been described in particular embodiments, it should be appreciated that the present invention should not be construed as limited by such embodiments, but rather construed according to the following claims.

What is claimed is:

1. A method for limiting the functionality of a mobile electronic device, said method comprising:

using a position determining component disposed within said mobile electronic device to determine the speed of said mobile electronic device, said position determining occurring within said mobile electronic device;

determining, within said mobile electronic device, that the speed of said mobile electronic device exceeds a speed threshold;

restricting the functionality of said mobile electronic device based upon said determining, wherein said restricting comprises restricting the use of a keypad of said mobile electronic device, and wherein said restricting is initiated and accomplished entirely within said mobile electronic device;
using an automotive based voice activation system to receive a spoken command; and
utilizing a short range wireless personal area network to control said mobile electronic device based upon said spoken command.

2. The method as recited in claim 1 wherein said using said position determining component further comprises:
utilizing a Global Navigation Satellite System (GNSS) compliant position determining component to determine the speed of said mobile electronic device.

3. The method as recited in claim 2 further comprising:
using said GNSS compliant position determining component to determine a current geographic position of said mobile electronic device; and
determining that said current geographic position of said mobile electronic device comprises a road.

4. The method as recited in claim 1 wherein said restricting the functionality of said mobile electronic device comprises:
generating an audible warning in response to said determining.

5. The method as recited in claim 1 wherein said restricting the use of said keypad further comprises:
permitting an allowed key sequence to be entered using said keypad.

6. The method as recited in claim 1 wherein said restricting the use of said keypad further comprises:
disabling said keypad.

7. The method as recited in claim 1 wherein said restricting the functionality of said mobile electronic device comprises:
restricting the use of said mobile electronic device to receiving incoming telephone calls.

8. The method as recited in claim 7 wherein said restricting the use of said mobile electronic device to incoming telephone calls further comprises:
determining that said incoming telephone call is not from a permitted originator; and
terminating said incoming telephone call.

9. The method as recited in claim 7 further comprising:
determining that a telephone call using said mobile electronic device originated prior to said determining the speed of said mobile electronic device; and
permitting said telephone call to continue subsequent to said determining that said speed exceeds said speed threshold.

10. The method as recited in claim 1 wherein said restricting the functionality of said mobile electronic device comprises:
requiring the use of a hands-free device to operate said mobile electronic device.

11. The method as recited in claim 1 further comprising:
requiring the use of a voice activation system to utilize said mobile electronic device.

12. The method as recited in claim 1 further comprising:
selecting said mobile electronic device from the group consisting of a cellular telephone and a personal digital assistant (PDA).

13. The method as recited in claim 1 wherein said restricting the functionality of said mobile electronic device comprises:
shutting off said mobile electronic device.

14. A mobile electronic device comprising:
a bus;
a memory coupled with said bus;
a position determining component coupled with said bus; and
a processor coupled with said bus, said processor for executing a method for limiting the functionality of a mobile electronic device, said method comprising:
using said position determining component to determine the speed of said mobile electronic device, said position determining occurring within said mobile electronic device;
determining, within said mobile electronic device, that a telephone call using said mobile electronic device originated prior to said determining the speed of said mobile electronic device;
determining, within said mobile electronic device, that the speed of said mobile electronic device exceeds a speed threshold;
restricting the functionality of said mobile electronic device based upon said determining, wherein said telephone call is permitted to continue subsequent to said determining that said speed exceeds said speed threshold, and wherein said restricting is initiated and accomplished entirely within said mobile electronic device;
requiring the use of an automotive based voice activation system to receive a spoken command; and
utilizing a short range wireless personal area network to control said mobile electronic device based upon said spoken command.

15. The mobile electronic device of claim 14 wherein said position determining component comprises a Global Navigation Satellite System (GNSS) compliant position determining component.

16. The mobile electronic device of claim 15 wherein said method further comprises:
using said position determining component to determine a current geographic position of said mobile electronic device; and
determining that said current geographic position of said mobile electronic device comprises a road.

17. The mobile electronic device of claim 14 wherein said restricting the functionality of said mobile electronic device comprises:
generating an audible warning in response to said determining.

18. The mobile electronic device of claim 14 wherein said restricting the functionality of said mobile electronic device comprises:
restricting the use of a keypad of said mobile electronic device.

19. The mobile electronic device of claim 18 wherein said restricting the use of said keypad further comprises:
permitting an allowed key sequence to be entered using said keypad.

20. The mobile electronic device of claim 18 wherein said restricting the use of said keypad further comprises:
disabling said keypad.

21. The mobile electronic device of claim 14 wherein said mobile electronic device comprises a cellular communication component and wherein said restricting the functionality of said mobile electronic device comprises:
restricting the use of said cellular communication component to receiving incoming telephone calls.

22. The mobile electronic device of claim 21 wherein said restricting the use of said mobile electronic device to receiving incoming telephone calls further comprises:

determining that said incoming telephone call is not from a permitted originator; and
terminating said incoming telephone call.

23. The mobile electronic device of claim 14 wherein said restricting the functionality of said mobile electronic device comprises:
requiring the use of a hands-free device to operate said mobile electronic device.

24. The mobile electronic device of claim 14 wherein said restricting the functionality of said mobile electronic device comprises:
requiring the use of a voice activation system to utilize said mobile electronic device.

25. The mobile electronic device of claim 14 wherein said mobile electronic device is selected from the group consisting of a cellular telephone and a personal digital assistant (PDA).

26. The mobile electronic device of claim 14 wherein said restricting the functionality of said mobile electronic device comprises:
shutting off said mobile electronic device.

27. A control component of a mobile electronic device, said control component comprising:
a speed input for receiving a speed of said mobile electronic device, said speed input disposed within said mobile electronic device;
a keypad disabler for disabling a keypad of said mobile electronic device, said speed keypad disabler disposed within said mobile electronic device;
a speed comparator for determining when the speed of said mobile electronic device exceeds a speed threshold, said speed comparator disposed within said mobile electronic device;
a function controller for restricting the functionality of said mobile electronic device based upon said determining, said function controller disposed within said mobile device and configured for initiating and accomplishing said restricting of functionality entirely within said mobile electronic device;
a voice activation verifier for verifying the use of a voice activation system to utilize said mobile electronic device; and
an automotive voice activation system verifier for verifying the use of a short range wireless personal area network to utilize said mobile electronic device.

28. The control component of claim 27 further comprising a coupling with a position determining component, wherein said position determining component comprises a Global Navigation Satellite System (GNSS) compliant position determining component disposed within said mobile electronic device.

29. The control component of claim 28 further comprising:
a geographic position input for receiving a current geographic position of said mobile electronic device;
a position comparator for determining that said current geographic position of said mobile electronic device comprises a road; and
an indication generator for generating an indication that said current geographic position comprises a road.

30. The control component of claim 27 further comprising:
an audible warning initiator for initiating an audible warning.

31. The control component of claim 27 further comprising:
a keypad restrictor for restricting the use of said keypad of said mobile electronic device.

32. The control component of claim 27 further comprising:
an allowed key sequence database;
a key sequence verifier for verifying that an input key sequence corresponds comprises a key sequence stored in said allowed key sequence database; and
a key sequence enabler for permitting said input key sequence to be entered using said keypad.

33. The control component of claim 27 further comprising:
a message restrictor for restricting the use of said mobile electronic device to receiving incoming telephone calls.

34. The control component of claim 33 further comprising:
a caller comparator for determining that said incoming telephone call is not from a permitted originator; and
a call terminator for terminating said incoming telephone call.

35. The control component of claim 27 further comprising:
a device verifier for verifying the use of a hands-free device to operate said mobile electronic device.

36. The control component of claim 27 wherein said mobile electronic device is selected from the group consisting of a cellular telephone and a personal digital assistant (PDA).

37. The control component of claim 27 further comprising:
a shut down initiator for initiating a shut down sequence of said mobile electronic device in response to said determining.

38. A cellular telephone comprising:
a bus;
a memory coupled with said bus;
a position determining component coupled with said bus; and
a processor coupled with said bus, said processor for executing a method for limiting the functionality of a cellular telephone, said method comprising:
using said position determining component to determine the speed of said cellular telephone, said speed determining occurring within said cellular telephone;
determining, within said cellular telephone, that the speed of said cellular telephone exceeds a speed threshold;
requiring the use of a voice activation system to utilize said cellular telephone; and
restricting the functionality of said cellular telephone based upon said determining,
wherein said restricting comprises requiring the use of an automotive based voice activation system to receive a spoken command and utilizing a short range wireless personal area network to control said cellular telephone based upon said spoken command, and wherein said restricting is initiated and accomplished entirely within said cellular telephone.

39. The cellular telephone of claim 38 wherein said position determining component comprises a Global Navigation Satellite System (GNSS) compliant position determining component.

40. The cellular telephone of claim 39 wherein said method further comprises:
using said position determining component to determine a current geographic position of said cellular telephone; and
determining that said current geographic position of said cellular telephone comprises a road.

41. The cellular telephone of claim 38 wherein said restricting the functionality of said cellular telephone comprises:
generating an audible warning in response to said determining.

42. The cellular telephone of claim 38 wherein said restricting the functionality of said cellular telephone comprises:
restricting the use of a keypad of said cellular telephone.

43. The cellular telephone of claim 42 wherein said restricting the use of said keypad further comprises:
permitting an allowed key sequence to be entered using said keypad.

44. The cellular telephone of claim 42 wherein said restricting the use of said keypad further comprises:
disabling said keypad.

45. The cellular telephone of claim 42 further comprising a cellular communication component and wherein said restricting the functionality of said cellular telephone comprises:
restricting the use of said cellular communication component to receiving incoming telephone calls.

46. The cellular telephone of claim 45 wherein said restricting the use of said cellular telephone to receiving incoming telephone calls further comprises:
determining that said incoming telephone call is not from a permitted originator; and
terminating said incoming telephone call.

47. The cellular telephone of claim 38 further comprising:
determining that a telephone call using said cellular telephone originated prior to said determining the speed of said cellular telephone; and
permitting said telephone call to continue subsequent to said determining that said speed exceeds said speed threshold.

48. The cellular telephone of claim 38 wherein said restricting the functionality of said cellular telephone comprises:
requiring the use of a hands-free device to operate said cellular telephone.

49. The cellular telephone of claim 38 wherein said restricting the functionality of said cellular telephone comprises:
shutting off said cellular telephone.

* * * * *